US006934411B2

(12) United States Patent
Bezryadin

(10) Patent No.: US 6,934,411 B2
(45) Date of Patent: Aug. 23, 2005

(54) METHOD AND APPARATUS FOR RGB COLOR CONVERSION THAT CAN BE USED IN CONJUNCTION WITH LOSSLESS AND LOSSY IMAGE COMPRESSION

(75) Inventor: Sergey N. Bezryadin, San Francisco, CA (US)

(73) Assignee: KWE International, Inc., San Francisco, CA (US)

(*) Notice: Subject to any disclaimer, the term of this patent is extended or adjusted under 35 U.S.C. 154(b) by 577 days.

(21) Appl. No.: 10/060,606

(22) Filed: Jan. 29, 2002

(65) Prior Publication Data

US 2003/0142864 A1 Jul. 31, 2003

(51) Int. Cl.[7] .......................... G06K 9/00; G06F 13/00
(52) U.S. Cl. ...................................... 382/162; 345/604
(58) Field of Search ................................ 382/162, 165, 382/166, 167, 276, 277; 358/1.9, 515, 518, 520, 523; 345/600, 603, 604

(56) References Cited

U.S. PATENT DOCUMENTS

| | | | | | |
|---|---|---|---|---|---|
| 5,515,172 | A | * | 5/1996 | Shiau | 358/520 |
| 5,659,406 | A | * | 8/1997 | Imao et al. | 358/518 |
| 5,731,988 | A | | 3/1998 | Zandi et al. | 364/526 |
| 6,044,172 | A | | 3/2000 | Allen | 382/166 |
| 6,366,291 | B1 | * | 4/2002 | Taniguchi et al. | 345/603 |
| 6,384,838 | B1 | * | 5/2002 | Hannah | 345/601 |
| 6,587,223 | B1 | * | 7/2003 | Yamaguchi | 358/1.9 |
| 6,621,604 | B2 | * | 9/2003 | DeLean | 358/518 |
| 6,804,026 | B1 | * | 10/2004 | Walmsley | 358/1.9 |

OTHER PUBLICATIONS

M. Rabbani et al., "An overview of the JPEG 2000 still image compression standard", Signal Processing: Image Communication 17 (2002) 3–48.

"Journal Issue Dispatch Dates" for journal "Signal Processing: Image", http://www.elsevier.com/cgi–bin/inca/dispatch/dispatch.cgi?pubidt=505651, printed out on Mar. 19, 2002.

* cited by examiner

*Primary Examiner*—Andrew W. Johns
*Assistant Examiner*—Amir Alavi
(74) *Attorney, Agent, or Firm*—Michael Shenker; MacPherson Kwok Chen & Heid LLP

(57) ABSTRACT

Methods and apparatus are provided for performing reversible color conversion on digital image data using integer computer arithmetic. This color conversion provides an approximation of the luminance component to the luminance as perceived by the human visual system with any necessary precision (Kd) and without multiplication and division operations other than shifts. The color conversion can be used in conjunction with a lossless or lossy compression/decompression process. Other embodiments, including non-reversible and non-integer color conversion, are also provided.

27 Claims, 5 Drawing Sheets

METHOD AND APPARATUS FOR RGB COLOR CONVERSION THAT CAN BE USED IN CONJUNCTION WITH LOSSLESS AND LOSSY IMAGE COMPRESSION

BACKGROUND OF THE INVENTION

1. Field of the Invention

The present invention relates to image conversion between the RGB (Red, Green Blue) color representation and another color representation. Some embodiments of the invention are suitable for use with lossless and lossy data compression/decompression systems for image data.

2. Related Art

In many applications that carry out color image processing, it is necessary to convert data between two color spaces. Many modern devices that deal with digital color images, such as computer monitors and TV equipment, use RGB (Red, Green, Blue) color representation. However, if we need to use compression for storing or transmitting large amounts of color image data, the RGB representation is not optimal. Usually data is converted from the RGB color coordinate system to a TV standard ($YC_bC_r$, YUV, YIQ) prior to compression. All of these TV standard systems provide luminance and chrominance separation. The change of chrominance is less perceptible to the human eye than the change of luminance, and some lossy compression techniques take advantage of this fact.

For example, the JPEG2000 standard uses the $YC_bC_r$ color coordinate system for lossy compression. JPEG2000 is a shorthand for the Joint Photographic Experts Group JPEG 2000 standard for coding of still pictures, described in "JPEG 2000 Final Committee Draft version 1.0," 16 Mar. 2000, incorporated herein by reference. The $YC_bC_r$ system is defined in terms of R, G, and B by the following matrix equation:

$$\begin{bmatrix} Y \\ C_b \\ C_r \end{bmatrix} = \begin{bmatrix} 0.299 & 0.587 & 0.114 \\ -0.1687 & -0.3313 & 0.5 \\ 0.5 & -0.4187 & -0.0813 \end{bmatrix} \begin{bmatrix} R \\ G \\ B \end{bmatrix}$$

Y is the luminance component, and $C_b$ and $C_r$ are chrominance components. The matrix equation implies that the luminance Y is given by the following equation:

$$Y = 0.299R + 0.587G + 0.114B \quad (1)$$

According to studies of the human visual perception, this equation is a good representation of the luminance as perceived by the human eye. Below, this representation is referred to as "the model of human visual system" and used as a standard against which other luminance representations are measured.

In digital image processing, the color at each pixel is usually represented by integer numbers. Thus, the data R, G, B, and the luminance and chrominance components are usually formatted as integers. However, the coefficients of the $YC_bC_r$ transformation are not integers and actual computer implementations of the RGB to $YC_bC_r$ conversion are not reversible because of numeric precision problems and an accumulation of errors.

When color conversion is used in conjunction with lossless compression, it is typically expected that the R, G, and B data can be recovered precisely (through decompression and reverse conversion), so the color conversion should be reversible. This is why the JPEG2000 standard uses a different color representation for lossless compression, namely:

$$\begin{bmatrix} Y \\ U \\ V \end{bmatrix} = \begin{bmatrix} 0.25 & 0.5 & 0.25 \\ 1 & -1 & 0 \\ 0 & -1 & 1 \end{bmatrix} \begin{bmatrix} R \\ G \\ B \end{bmatrix} \quad (2.1)$$

The luminance component in this representation is:

$$Y = \frac{1}{4}R + \frac{1}{2}G + \frac{1}{4}B \quad (2.2)$$

The chrominance components are:

$$U = R - G \quad (2.3)$$

$$V = B - G \quad (2.4)$$

It has been shown in U.S. Pat. No. 5,731,988 issued Mar. 24, 1998 to Zandi et al. that even though the Y coefficients in equation (2.2) are not integers, the transformation (2.1) is reversible.

Therefore, to perform both lossy and lossless compression according to the JPEG2000 standard, the compression system has to contain color converters of both types, i.e. both a $YC_bC_r$ converter and a converter for the transformation (2.1).

U.S. Pat. No. 6,044,172, issued Mar. 28, 2000 to Allen, discloses another reversible color conversion with a luminance that is closer to the model (1) than the luminance (2.2), namely:

$$Y = \left\lfloor \frac{3R + 6G + B}{10} \right\rfloor \quad (3.1)$$

$$U = R - G \quad (3.2)$$

$$V = B - G \quad (3.3)$$

Here $\lfloor x \rfloor$ symbolizes a floor function and indicates the largest integer not exceeding "x".

The transformation (3.1) is however more computationally expensive than (2.1).

SUMMARY

The invention is defined by the appended claims, which are incorporated into this section by reference. The following is a summary of some features of the invention.

The invention provide methods and apparatus for color conversion. In some embodiments, the color conversion is reversible, the luminance is close to the model (1), and the conversion is computationally inexpensive, it can be performed without any division or multiplication operations other than shifts. Some embodiments are suitable for use with both lossless and lossy compression/decompression processes. (The invention is not limited to such embodiments however. Also, the color conversion provided herein can be used not in conjunction with compression, but for any other purpose, whether known or not at this time.)

As discussed above, if a color conversion is to be used with lossy compression, the luminance coefficients should be close to the model representation (1). These coefficients are typically chosen so that their sum is equal to 1 in order for the number of bits in the Y representation be about the same as the number of bits in the R, G and B representation. For the chrominance components, the equations (2.3), (2.4) are suitable. Given these equations and the condition that the sum of the Y coefficients is 1, the color conversion can be defined by the following matrix:

$$\begin{bmatrix} \alpha & 1-\alpha-\beta & \beta \\ 1 & -1 & 0 \\ 0 & -1 & 1 \end{bmatrix} \quad (4)$$

where $0 \leq \alpha \leq 1$ $0 \leq \beta \leq 1$ $0 \leq \alpha+\beta \leq 1$

If $\alpha=0.299$ and $\beta=0.114$, the model equation (1) is obtained for the luminance. If $\alpha=0.25$ and $\beta=0.25$, the JPEG2000 transformation (2.1) is obtained.

For any given $\alpha$ and $\beta$, the degree to which the luminance differs from the model luminance (1) can be measured as:

$$K_d = \frac{\sqrt{(\alpha-0.299)^2 + (1-\alpha-\beta-0.587)^2 + (\beta-0.114)^2}}{\sqrt{0.299^2 + 0.587^2 + 0.114^2}} \cdot 100\% \quad (5)$$

$K_d$ is a scaled magnitude of the difference between the vector $(\alpha, 1-\alpha-\beta, \beta)$ and the corresponding vector $(0.299, 0.587, 0.114)$ for the model luminance (1).

Transformation (2.1) has $K_d=25.24\%$. The $K_d$ value for transformation (3.1, 3.2, 3.3) is only 2.86%, but, as mentioned, this transformation is more computationally expensive.

Denoting the chrominance components as $R_g$, $B_g$, the transformation (4) can be written as follows:

$Y=\alpha*R+(1-\alpha-\beta)*G+\beta*B$ (6.1)

$R_g=R-G$ (6.2)

$B_g=B-G$ (6.3)

The reverse transformation is:

$R=Y+(1-\alpha)*R_g-\beta*B_g$ (7.1)

$G=Y-\alpha*R_g-\beta*B_g$ (7.2)

$B=Y-\alpha*R_g+(1-\beta)*B_g$ (7.3)

It follows from equations (6.1), (6.2), and (6.3) that:

$Y=G+(\alpha*R_g+\beta*B_g)$ (8)

Let us assume that the components R, G, B, Y, and the chrominance components are formatted as integers. From the purely mathematical standpoint, the system of equations (6.1, 6.2, 6.3) and the system of equations (8, 6.2, 6.3) are equivalent to each other. However, if the color data are integers, modification of the order of operations can affect reversibility as explained below. Also note that the equation (8) has only two multiplications versus three multiplications in equation (6.1).

The forward transformation (6), i.e. the transformation (6.1)–(6.3), can be written as follows:

$R_g=R-G$ (9.1)

$B_g=B-G$ (9.2)

$P=\alpha R_g+\beta B_g$ (9.3)

$Y=G+P$ (9.4)

Equations (9.1) through (9.4) involve only two multiplications and four additions, compared to three multiplications and four additions in equations (6).

The reverse transformation (7), i.e. the transformation (7.1)–(7.3), can be written as follows:

$P=\alpha R_g+\beta B_g$ (10.1)

$G=Y-P$ (10.2)

$R=R_g+G$ (10.3)

$B=B_g+G$ (10.4)

The reverse transformation equations also have only two multiplications and four additions.

In some embodiments of the present invention, the forward and reverse transformations are implemented by performing a computation for each of the equations (9.1) through (9.4) and (10.1) through (10.4). In other words, to perform the forward transformation, the image processing system calculates $R_g$ and $B_g$ according to equations (9.1) and (9.2). Each of these values is calculated by an adder or a subtractor. From these values, the value for P is calculated according to equation (9.3), which requires two multiplications and an addition. Y is calculated according to equation (9.4) by an adder. Likewise, the reverse transformations are implemented by performing a computation for each of the equations (10.1) through (10.4).

Implemented this way, the forward transformation is reversible for any values of $\alpha$ and $\beta$ whether or not the values P in equations (9.3), (10.1) are computed with a rounding error, as long as the rounding error is the same in both of these computations and the remaining forward and reverse computations are performed without any new rounding errors. (It should be noted that a transformation may be reversible or non-reversible depending on its implementation.) Indeed, suppose that the computation (9.3) involves some rounding error E, that is, instead of P the system generates PE=P+E. Then Y will be computed, according to equation (9.4), with the same error E, that is, instead of Y the system will generate YE=Y+E.

The reverse computation will start with YE, $R_g$, and $B_g$. P will be calculated according to equation (10.1), with the same rounding error E, so the system will generate PE=P+E. G will be generated as YE−PE according to equation (10.2). YE−PE=Y−P, so G will be recovered without an error. Therefore, R and B will also be recovered without an error in computations (10.3) and (10.4).

This reasoning applies when the values R, G, B, P, Y, $R_g$, $B_g$ are formatted as integers, and all of the computations are performed by integer computer arithmetic devices. This reasoning is also valid for non-integer values and computations.

Similar reasoning shows that the transformation (9), i.e., the transformation defined by equations (9.1) through (9.4), when implemented with a computation for each of the equations, is reversible when P is any function $f(R_g, B_g)$, whether or not the values R, G, B, P, Y, $R_g$, $B_g$ are integers. In other words, the following computations define a reversible color transformation:

$R_g=R-G$ (11.1)

$B_g=B-G$ (11.2)

$P=f(R_g,B_g)$ (11.3)

$Y=G+P$ (11.4)

The reverse transformation can be performed with the following computations:

$P=f(R_g,B_g)$ (12.1)

$G=Y-P$ (12.2)

$$R=R_g+G; \quad (12.3)$$

$$B=B_g+G. \quad (12.4)$$

The reversibility is obtained even if the values P in equations (11.3), (12.1) are computed with a rounding error, as long as the rounding error is the same in both of these computations and the remaining forward and reverse computations are performed without any new rounding errors.

In the linear case (equations (9), (10)), computationally inexpensive color conversion, with a good approximation of the luminance component to the model (1), can be found by minimizing the value Kd for all of the possible values of $\alpha$ and $\beta$ in the range [0,1] such that $\alpha+\beta$ is in the same range and each of the values of $\alpha$ and $\beta$ is in the form $k/2^n$, where k and n are integers and n is some fixed value. Multiplications and divisions by $k/2^n$ can be implemented as shifts and additions, and often are computationally inexpensive.

The invention is not limited to the computations (9), (10), (11), (12), or reversible implementations. Other embodiments of the invention are described below. The invention is defined by the appended claims.

DESCRIPTION OF PREFERRED EMBODIMENTS

Figure 1:
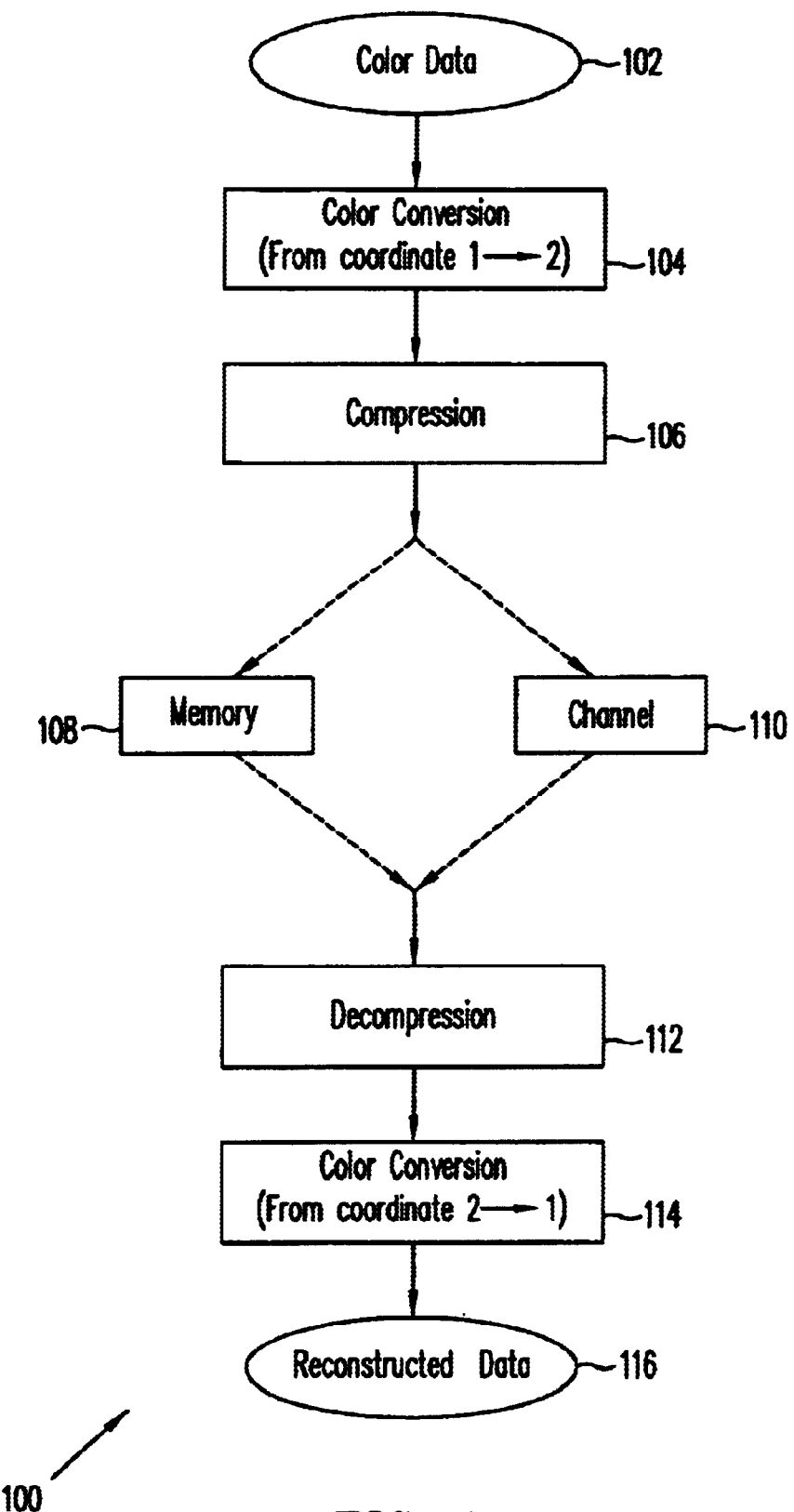
FIG. 1 is a flowchart of a color transformation process used in an embodiment of the present invention.

FIG. 1 is a color data processing flowchart. At step 104, RGB data 102 is converted to the $YR_gB_g$ format. This step implements the transformation (11). The $YR_gB_g$ data are then compressed (step 106). The compressed data are stored in memory (step 108) or transmitted over a network (step 110) or both (the data can be stored in memory before and/or after transmission). The stored or transmitted data are decompressed (step 112) and converted back to the RGB format (step 114). Step 114 implements the transformation (12). The reconstructed RGB data are shown at step 116. The data are then displayed by a suitable display system (not shown).

Process 100 can be performed by circuits specially designed for that purpose, or by one or more general purpose computers, or by a combination of the above. Both hardwired and software implementations are possible, as well as a combination of these implementation types. The software can be stored on a computer readable medium (a semiconductor memory, a disk, or some other medium) known or to be invented.

The signals R, G, B, $R_g$, $B_g$, P, Y are digital data signals. Each signal represents the corresponding value R, G, B, $R_g$, $B_g$, P, or Y in 8 bits or some other number of bits. In some embodiments, more bits are used for the values $R_g$, $B_g$ than for the values R, G, B in order to calculate the values $R_g$, $B_g$ without error. For example, if n bits are used for the values R, G, B, then n+1 bits can be used for the values $R_g$, $B_g$. The signal (−G) in equations (11.1), (11.2) can also be represented with n+1 bits. Signals R, G and B can be formatted as unsigned integers. The loss of precision in calculating the values P and Y is recoverable in the reverse transformation (12) as explained above.

In some integer embodiments, the data −G, $R_g$, $B_g$ are represented using only n bits. These data are calculated modulo $2^n$. The transformation (9) is reversible since the data R, G, B are between 0 and $2^n-1$ (inclusive). However, in some of such embodiments, the luminance Y could deviate more from the model (1).

Figure 2:
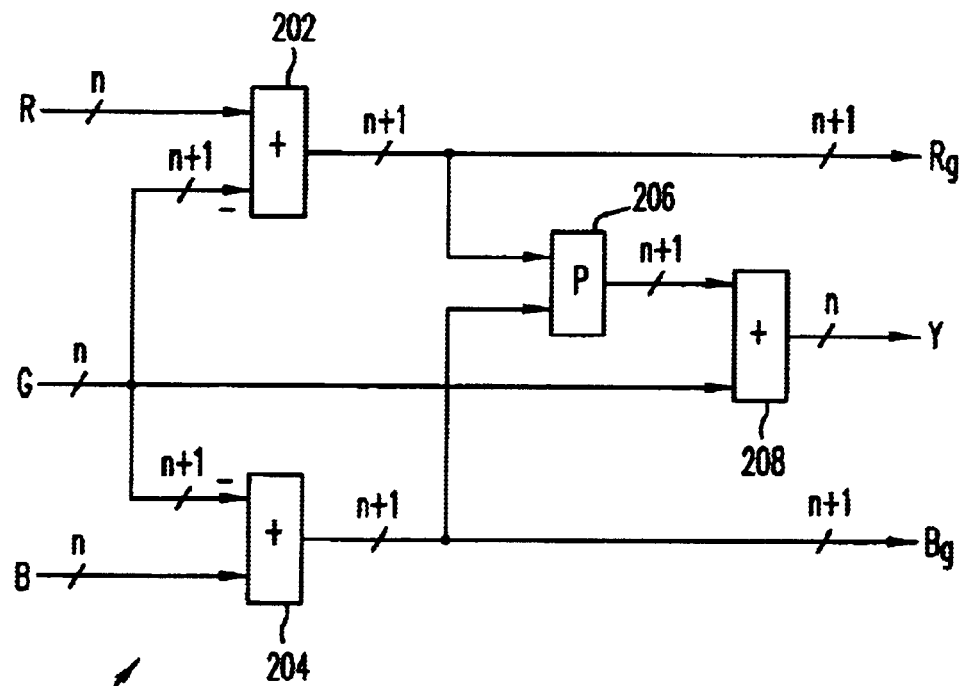
FIG. 2 is a block diagram of a circuit implementing a forward color conversion in accordance with an embodiment of the present invention.

FIG. 2 illustrates a circuit 200 implementing the forward transformation (11). Block 202 (an adder or a subtractor, for example) receives the n-bit digital data signals R and G and generates the n+1 bit digital data signals $R_g$=R−G (equation (11.1)). Block 204 (an adder or a subtractor, for example) receives the n-bit data signals B and G and generates the n+1 bit data signal $B_g$=B−G (equation (11.2)). Block 206 receives the data $R_g$, $B_g$ from blocks 202, 204 and generates the n+1 bit data signal P=f($R_g$,$B_g$) (equation (11.3)). Block 208 (an adder, for example) receives the data P from block 206 and also receives the data G, and generates the n bit data signal Y=G+P (equation (11.4)). Signal (−G) is produced from unsigned integer signal G outside or inside of blocks 202, 204 depending on implementation.

Exemplary implementations of block 206 are described below with reference to FIGS. 4 through 9.

Figure 3:
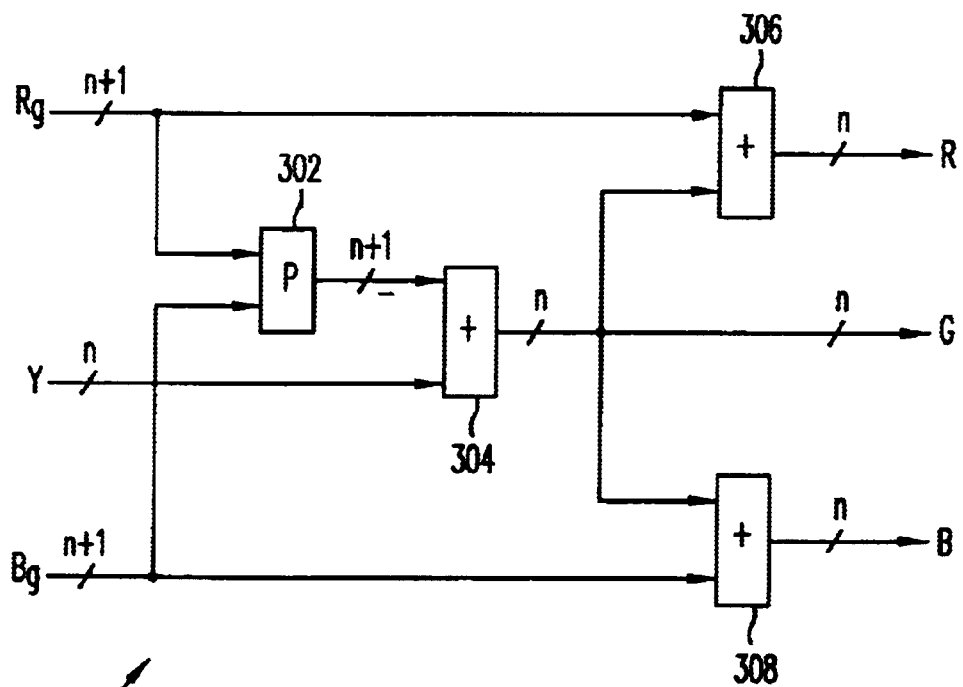
FIG. 3 is a block diagram of a circuit implementing a reverse color conversion in accordance with an embodiment of the present invention.

FIG. 3 shows a circuit 300 implementing the inverse transformation (12). Block 302 receives the n+1 bit data signals $R_g$, $B_g$ and generates the signal P=f($R_g$,$B_g$) (equation (12.1)). The function f implemented by block 302 is the same function as implemented by block 206. The same precision is used in blocks 206, 302 if reversibility is desired. Blocks 206, 302 can be identical to each other.

Block 304 (an adder or a subtractor, for example) receives the data signal P from block 302 and also receives the n-bit data Y, and generates the n-bit data signal G=Y−P (equation (12.2)). Block 306 (an adder, for example) receives the data G from block 304 and also receives the signal $R_g$, and generates the n-bit data signal R=$R_g$+G (equation (12.3)). Block 308 (an adder, for example) receives the signal G from block 304 and also receives the signal $B_g$, and generates the n-bit signal B=$B_g$+G (equation (12.4)).

Figure 4:
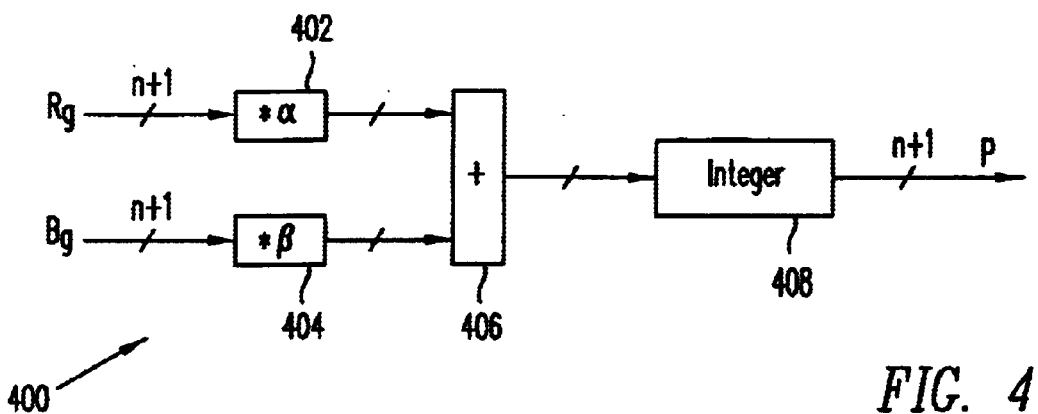
FIGS. 4–9 are block diagrams of circuits, in accordance with embodiments of the present invention.

FIG. 4 shows a circuit 400 which can implement either block 206 or block 302 (FIGS. 2 and 3, respectively) to generate the P signal when f($R_g$,$B_g$) is a linear function. See equations (9.3), (10.1). Block 402 receives the n+1 bit data signal $R_g$ and generates the signal $\alpha*R_g$. Block 404 receives the n+1 bit data signal $B_g$ and generates the signal $\beta*B_g$. Blocks 402, 404 can include fixed or floating point multipliers or dividers, shifters, or other circuits. Signals $\alpha R_g$, $\beta B_g$ can be in integer, fixed or floating point format. For example, in some embodiments, each of these signals has a signed integer format. In another example, signals $R_g$ and $B_g$ have a signed integer format, signals $\alpha$ and $\beta$ have a floating point format, and the blocks 402, 404 perform floating point computations. Block 406, described below, may also perform a floating point computation. In some embodiments, the function of each of blocks 402, 404, 406 is performed by a computer processor, and the number of bits at the output of these blocks can be a standard number of bits for the particular processor (64 bits for example).

Block 406 (a floating-point adder, for example) receives the signals $\alpha*R_g$ and $\beta*B_g$ from blocks 402, 404 and generates the sum signal $\alpha*R_g+\beta*B_g$. Block 408 receives the signal $\alpha*R_g+\beta*B_g$ from block 406, rounds the value $\alpha*R_g+\beta*B_g$ to an n+1 bit signed integer, and provides the n+1 bit signal P.

Table 1 below shows the values Kd, defined above, for the values of α and β chosen to minimize Kd given a certain number of bits for representing each of the α and β parameters. Thus, each of α and β can be written as $k/2^n$. The number n, shown in the last column, is recommended as the minimum number of bits to represent R, G and B for obtaining a luminance Y close to the model (1). The rounding errors in the Y computation should be small for a good approximation of the model luminance (1).

TABLE 1

| α | 1-α-β | β | Kd | Number of bits for α and β |
|---|---|---|---|---|
| 2/8 = 0.2500 | 5/8 = 0.6250 | 1/8 = 0.1250 | 9.42% | 3 |
| 5/16 = 0.3125 | 9/16 = 0.5625 | 2/16 = 0.1250 | 4.50% | 4 or 5 |
| 19/64 = 0.2969 | 38/64 = 0.5938 | 7/64 = 0.1094 | 1.26% | 6 or 7 |
| 77/256 = 0.3008 | 150/256 = 0.5859 | 29/256 = 0.1133 | 0.33% | 8 |
| 306/1024 = 0.2988 | 601/1024 = 0.5869 | 117/1024 = 0.1143 | 0.04% | 10 |

Figure 5:
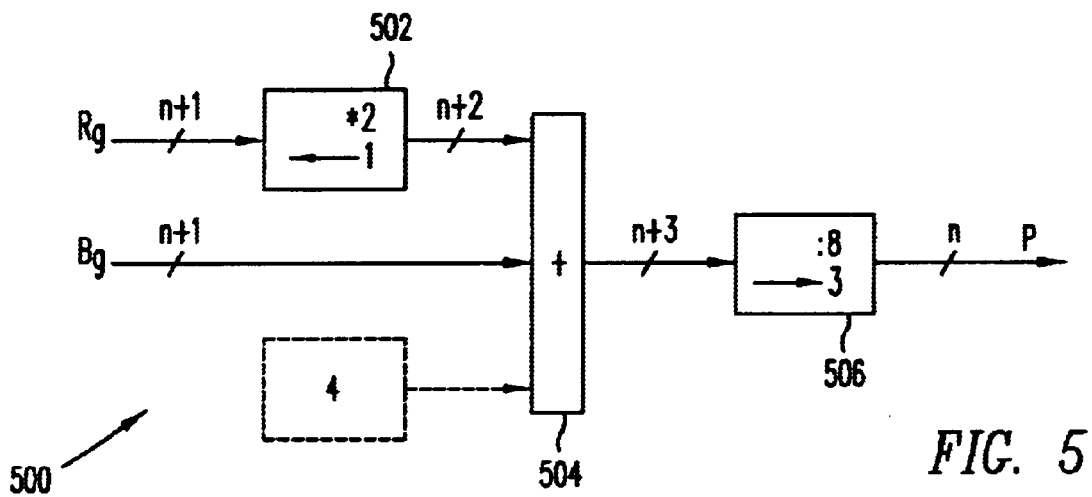

FIGS. 5 through 9 show circuits that can implement the blocks 206, 302 to generate the P signal for the embodiments of Table 1. FIG. 5 shows a circuit 500 that generates the P signal for α=2/8 and β=1/8. Shifter 502 receives the n+1 bit signal $R_g$ and shifts $R_g$ left by 1 bit, thus generating an n+2 bit signal $R_g*2$. Adder 504 adds together the output of shifter 502 and the n+1 bit value $B_g$ and a number 4 to generate an n+3 bits signal $R_g*2+B_g+4$. Shifter 506 shifts the output of adder 504 right by 3 bits, thus generating the signal $P=R_g/4+B_g/8 +½$. The three least significant bits (LSBs) are dropped (the shift can be implemented simply by dropping the three LSBs). This corresponds to P being $\alpha R_g+\beta B_g$ rounded to the nearest integer (as is well know, such rounding can be accomplished by adding ½ and dropping the fractional bits).

Figure 6:
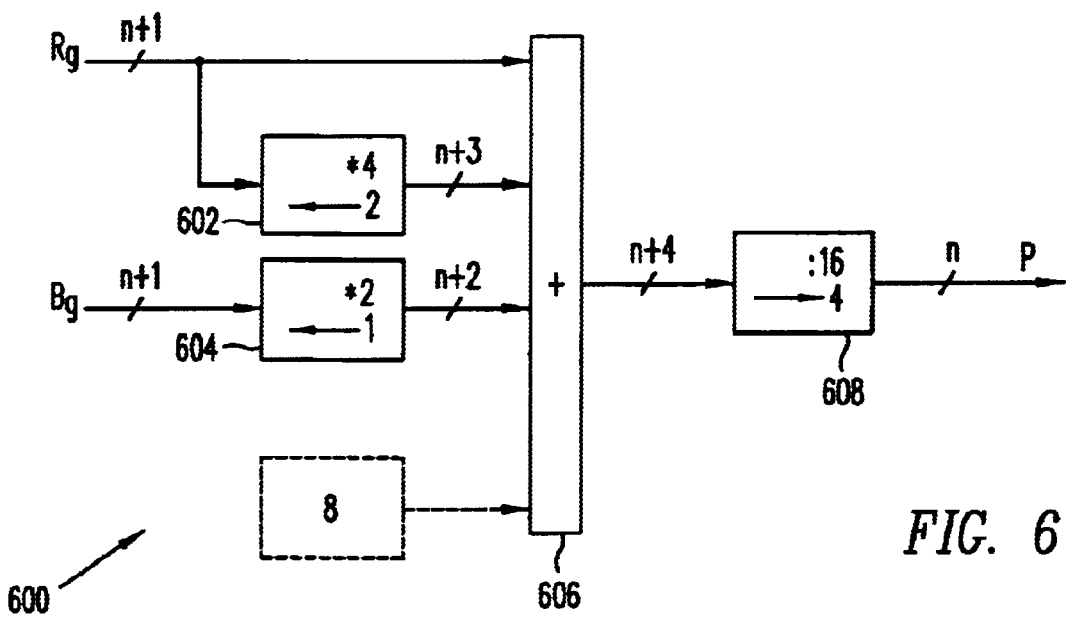

FIG. 6 shows a circuit 600 that generates the signal P for α=5/16, β=2/16. Shifter 602 shifts the n+1 bit data signal $R_g$ left by 2 bits, thus generating an n+3 bit signal $R_g*4$. Shifter 604 shift n+1 bit signal $B_g$ left by 1 bit, thus generating an n+2 bit signal $B_g*2$. Adder 606 adds together the outputs of shifters 602, 604, number 8 and the data $R_g$, thus generating an n+4 bit signal $R_g*5+B_g*2+8$. Number 8 is added for rounding to the nearest integer to improve luminance approximation as explained above in reference to FIG. 5. Shifter 608 shifts the output of adder 606 right by 4 bits dropping the four LSBs, generating an n bits signal $P=R_g*5/16+B_g*2/16$ rounded to the nearest integer. The shifting can be accomplished simply by dropping the four LSBs.

Figure 7:
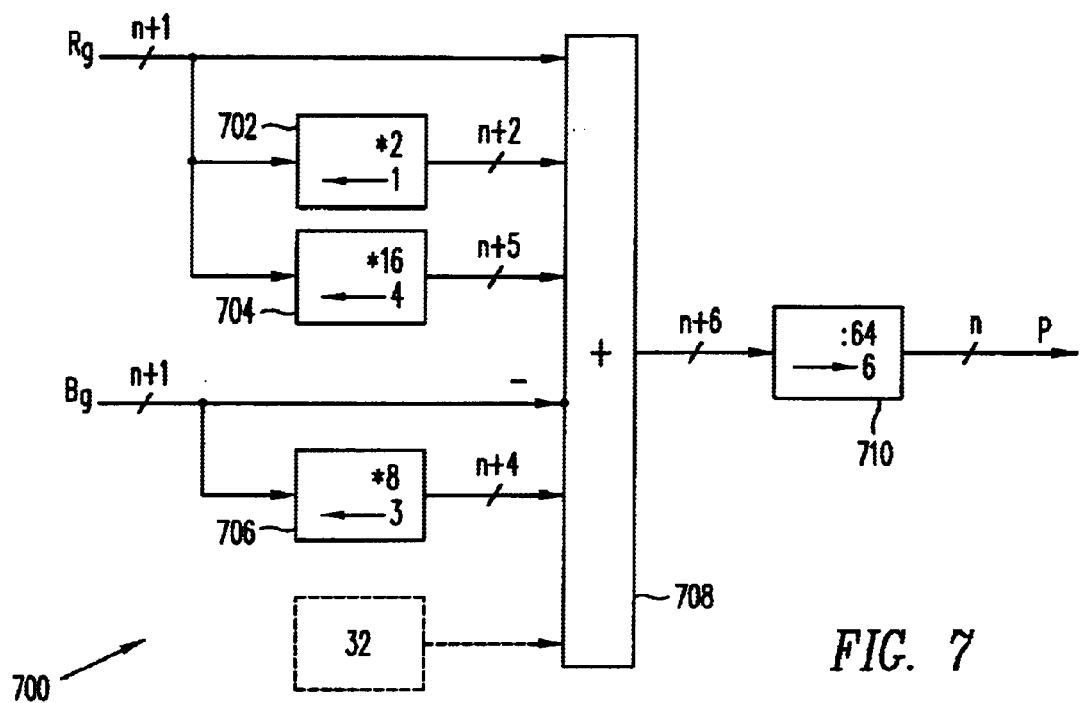

FIG. 7 shows a circuit 700 that generates the signal P for α=19/64 and β=7/64. Shifter 702 shifts the n+1 bit signal $R_g$ left by 1 bit, to generate an n+2 bit signal $R_g*2$. Shifter 704 shifts $R_g$ left by 4 bits, to generate an n+5 bit signal $R_g*16$. Shifter 706 shifts n+1 bits $B_g$ left by 3 bits, to generate an n+4 bit signal $B_g*8$. Adder 708 adds together the outputs of shifters 702, 704, 706, number 32 (for rounding) and the data $R_g$, and the adder subtracts $B_g$. The output of adder 708 thus represents the n+6 bit value $R_g*19+B_g*7+32$. Shifter 710 shifts the output of adder 708 right by 6 bits (drops the six LSBs), thus generating the n bits signal $P=R_g*19/64+B_g*7/64$ rounded to the nearest integer.

Figure 8:
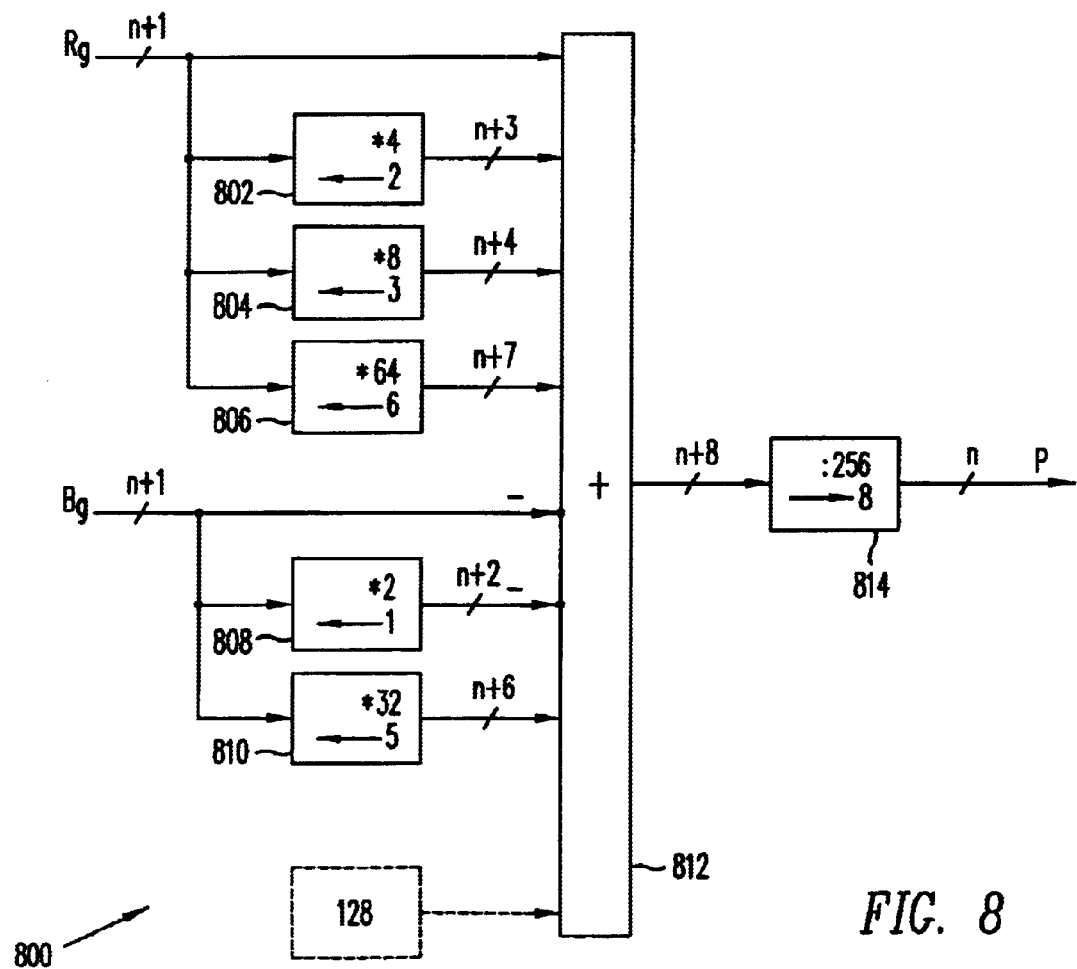

FIG. 8 shows a circuit 800 that generates the signal P for α=77/256 and β=29/256. Shifter 802 shifts the n+1 bit signal $R_g$ left by 2 bits, thus generating an n+3 bit signal $R_g*4$. Shifter 804 shifts $R_g$ left by 3 bits, thus generating an n+4 bit signal $R_g*8$. Shifter 806 shifts $R_g$ left by 6 bits, thus generating n+7 bit signal $R_g*64$.

Shifter 808 shifts n+1 bits $B_g$ left by 1 bit, thus generating an n+2 bits signal $B_g*2$. Shifter 810 shifts $B_g$ left by 5 bits, thus generating an n+6 bits signal $B_g*32$.

Adder 812 receives the signals $R_g$, $B_g$ and the outputs of shifters 802, 804, 806, 808, and 810. Adder 812 inverts the signal $B_g$ and the output of shifter 808, and adds the inverted signals to $R_g$ and the outputs of shifters 802, 804, 806, and 810, also adding a number 128 for rounding, thus generating an n+8 bit signal $R_g*77+B_g*29 +128$. Shifter 814 shifts the output of adder 812 right by 8 bits (drops the eight LSBs), thus generating an n bit signal $P=R_g*77/256+B_g*29/256$ rounded to the nearest integer.

Figure 9:
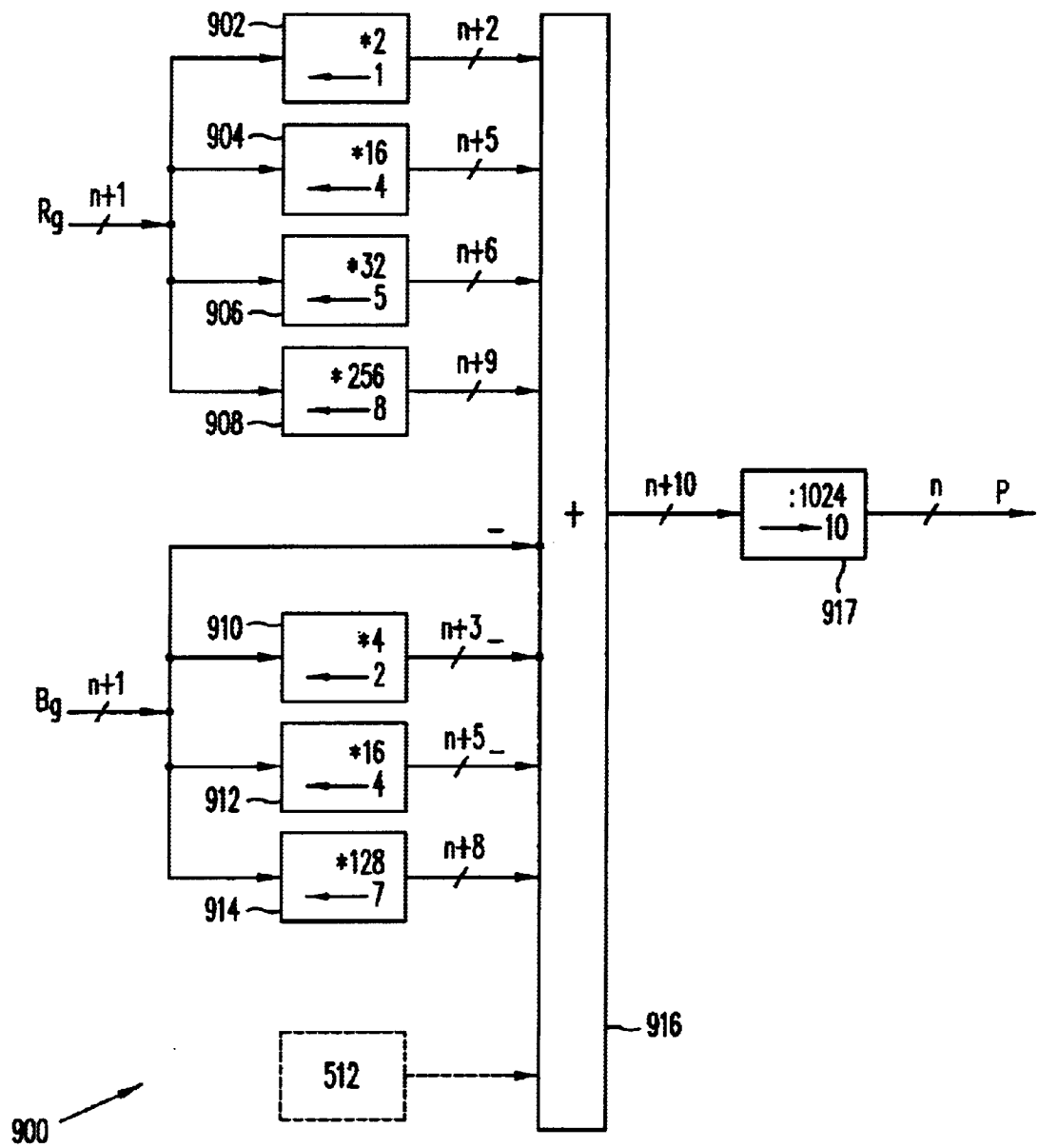

FIG. 9 shows a circuit 900 that generates the signal P for α=306/1024 and β=117/1024. Shifter 902 shifts the n+1 bit signal $R_g$ left by 1 bit, thus generating an n+2 bit signal $R_g*2$. Shifter 904 shifts $R_g$ left by 4 bits, thus generating an n+5 bit signal $R_g*16$. Shifter 906 shifts $R_g$ left by 5 bits, thus generating an n+6 bit signal $R_g*32$. Shifter 908 shifts $R_g$ left by 8 bits, thus generating an n+9 bit signal $R_g*256$.

Shifter 910 shifts n+1 bit signal $B_g$ left by 2 bits, thus generating an n+3 bit signal $B_g*4$. Shifter 912 shifts $B_g$ left by 4 bits, thus generating an n+5 bit signal $B_g*16$. Shifter 914 shifts $B_g$ left by 7 bits, thus generating an n+8 bit signal $B_g*128$.

Adder 916 receives the signal $B_g$ and the outputs of shifters 902, 904, 906, 908, 910, 912, and 914. Adder 916 inverts the signal $B_g$ and the outputs of shifters 910, 912, and adds the inverted signals to the outputs of shifters 902, 904, 906, 908, 914 and to number 512 (for rounding), thus generating an n+10 bit signal $R_g*306+B_g*117+512$. Shifter 918 shifts the outputs of adder 916 right by 10 bits (drops the 10 LSBs), thus generating n bit signal $P=R_g*306/1024+B_g*117/1024$ rounded to the nearest integer.

The embodiments described above illustrate but do not limit the invention. The invention is not limited to the particular numbers of bits described above, or to integer computer arithmetic. Blocks 802, 804 and other shifters and adders described above can be replaced by circuits other than shifters and adders. These block can share circuitry. They can be implemented by software programmable computer processors. Numerous other modifications and variations are possible in accordance with the principles of the present invention. The invention is defined by the appended claims.

I claim:

1. A color conversion method comprising:
    (a) receiving RGB data representing the red (R), green (G), and blue (B) components of one or more colors;
    (b) generating by circuitry, from the RGB data, data $R_g=R-G$;
    (c) generating by circuitry, from the RGB data, data $B_g=B-G$;
    (d) generating by circuitry, from the $R_g$ and $B_g$ data, data $P=f(R_g,B_g)$ where f is a predefined function;
    (e) generating by circuitry, from the RGB data and the P data, data $Y=G+P$;
    wherein the Y, $R_g$, and $B_g$ data represent said one or more colors.

2. The method of claim 1 wherein the operations (b), (c), (e) are performed without rounding errors.

3. The method of claim 1 further comprising recovering the RGB data from the Y, $R_g$, and $B_g$ data, the recovering operation comprising:
(f) generating by circuitry, from the $R_g$ and $B_g$ data, data $P=f(R_g, B_g)$;
(g) generating by circuitry, from the Y data and from the P data generated in operation (f), data Y−P, and providing the data Y−P as the recovered data G;
(h) generating by circuitry, from the $R_g$ data and from the G data provided in operation (g), data $R_g+G$, and providing the data $R_g+G$ as the recovered data R;
(i) generating by circuitry, from the $B_g$ data and from the G data provided in operation (g), data $B_g+G$, and providing the data $B_g+G$ as the recovered data B.

4. The method of claim 3 wherein:
operations (g), (h), (i) are performed without rounding errors;
if an error occurs in the generation of data P in operation (d), then the same error occurs in the generation of the data P in operation (f).

5. The method of claim 1 wherein $f(R_g, B_g)=\alpha*R_g+\beta*B_g$, where $\alpha$ and $\beta$ are predefined numbers.

6. The method of claim 5 wherein:
$\alpha=2/8$ and $\beta=1/8$; or
$\alpha=5/16$ and $\beta=2/16$; or
$\alpha=19/64$ and $\beta=7/64$; or
$\alpha=77/256$ and $\beta=29/256$; or
$\alpha=306/1024$ and $\beta=117/1024$.

7. The method of claim 1 wherein the operations (b) through (e) are performed by circuitry capable of performing only one or more of the following operations: addition, subtraction, obtaining a negative of a number, and shifting.

8. The method of claim 1 wherein said method comprises a software programmed computer processor.

9. A computer readable medium comprising one or more computer instructions for performing the method of claim 1.

10. A color conversion method comprising:
(a) receiving $YR_gB_g$ data representing the luminance value Y and the chrominance values $R_g$, $B_g$ of one or more colors;
(b) generating by circuitry, from the $YR_gB_g$ data, data $P=f(R_g,B_g)$, where f is a predefined function;
(c) generating by circuitry, from the $YR_gB_g$ data and the P data, data G=Y−P;
(d) generating by circuitry, from the $YR_gB_g$ data and the G data, data $R=R_g+G$;
(e) generating by circuitry, from the $YR_gB_g$ data and the G data, data $B=B_g+G$;
wherein the R data, the G data, and the B data represent respectively the red green, and blue components of the one or more colors.

11. The method of claim 10 wherein the operations (c), (d), (e) are performed without rounding errors.

12. The method of claim 10 wherein $f(R_g, B_g)=\alpha*R_g+\beta*B_g$, where $\alpha$ and $\beta$ are predefined numbers.

13. The method of claim 12 wherein:
$\alpha=2/8$ and $\beta=1/8$; or
$\alpha=5/16$ and $\beta=2/16$; or
$\alpha=19/64$ and $\beta=7/64$; or
$\alpha=77/256$ and $\beta=29/256$; or
$\alpha=306/1024$ and $\beta=11/1024$.

14. The method of claim 10 wherein the operations (b) through (e) are performed by circuitry capable of performing only one or more of the following operations: addition, subtraction, obtaining a negative of a number, and shifting.

15. A computer readable medium comprising one or more computer instructions for causing a computer processor to perform the method of claim 10.

16. An apparatus comprising circuitry for:
(a) receiving RGB data representing the red (R), green (G), and blue (B) components of one or more colors;
(b) generating, from the RGB data, data $R_g$=R−G;
(c) generating, from the RGB data, data $B_g$=B−G;
(d) generating, from the $R_g$ and $B_g$ data, data $P=f(R_g,B_g)$ where f is a predefined function;
(e) generating, from the RGB data and the P data, data Y=G+P;
wherein the Y, $R_g$, and $B_g$ data represent said one or more colors.

17. The apparatus of claim 16 wherein the operations (b), (c), (e) are performed without rounding errors.

18. The apparatus of claim 16 further comprising circuitry for recovering the RGB data from the Y, $R_g$, and $B_g$ data, the recovering operation comprising:
(f) generating, from the $R_g$ and $B_g$ data, data $P=f(R_g, B_g)$;
(g) generating, from the Y data and from the P data generated in operation (f), data Y−P, and providing the data Y−P as the recovered data G;
(h) generating, from the $R_g$ data and from the G data provided in operation (g), data $R_g+G$, and providing the data $R_g+G$ as the recovered data R;
(i) generating, from the $B_g$ data and from the G data provided in operation (g), data $B_g+G$, and providing the data $B_g+G$ as the recovered data B.

19. The apparatus of claim 18, wherein:
operations (g), (h), (i) are performed without rounding errors;
if an error occurs in the generation of data P in operation (d), then the same error occurs in the generation of the data P in operation (f).

20. The apparatus of claim 16 wherein $f(R_g, B_g)=\alpha*R_g+\beta*B_g$, where $\alpha$ and $\beta$ are predefined numbers.

21. The apparatus of claim 20 wherein:
$\alpha=2/8$ and $\beta=1/8$; or
$\alpha=5/16$ and $\beta=2/16$; or
$\alpha=19/64$ and $\beta=7/64$; or
$\alpha=77/256$ and $\beta=29/256$; or
$\alpha=306/1024$ and $\beta=117/1024$.

22. The apparatus of claim 16 wherein the operations (b) through (e) are performed by circuitry capable of performing only one or more of the following operations: addition, subtraction, obtaining a negative of a number, and shifting.

23. An apparatus comprising circuitry for:
(a) receiving $YR_gB_g$ data representing the luminance value Y and the chrominance values $R_g$, $B_g$ of one or more colors;
(b) generating, from the $YR_gB_g$ data, data $P=f(R_g,B_g)$, where f is a predefined function;
(c) generating, from the $YR_gB_g$ data and the P data, data G=Y−P;
(d) generating, from the $YR_gB_g$ data and the G data, data $R=R_g+G$;
(e) generating, from the $YR_gB_g$ data and the G data, data $B=B_g+G$;
wherein the R data, the G data, and the B data represent respectively the read, green, and blue components of the one or more colors.

24. The apparatus of claim 23 wherein the operations (c), (d), (e) are performed without rounding errors.

25. The apparatus of claim 23 wherein $f(R_g, B_g) = \alpha * R_g + \beta * B_g$, where $\alpha$ and $\beta$ are predefined numbers.

26. The apparatus of claim 25 wherein:

$\alpha = 2/8$ and $\beta = 1/8$; or $\alpha = 5/16$ and $\beta = 2/16$; or $\alpha = 19/64$ and $\beta = 7/64$; or $\alpha = 77/256$ and $\beta = 29/256$; or $\alpha = 306/1024$ and $\beta = 117/1024$.

27. The apparatus of claim 23 wherein the operations (b) through (e) are performed by circuitry capable of performing only one or more of the following operations: addition, subtraction, obtaining a negative of a number, and shifting.

* * * * *